United States Patent
Pol et al.

(10) Patent No.: US 6,707,260 B2
(45) Date of Patent: Mar. 16, 2004

(54) CIRCUIT ARRANGEMENT INCLUDING DC-AC CONVERTER HAVING A DEPENDABLE START CIRCUIT

(75) Inventors: Nicolaas Hendrik Mario Pol, Shanghai (CN); Feng-Kang Hu, Palos Verdes Estates, CA (US); Yimin Chen, Mount Prospect, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/255,846

(22) Filed: Sep. 26, 2002

(65) Prior Publication Data

US 2003/0102815 A1 Jun. 5, 2003

(30) Foreign Application Priority Data

Oct. 1, 2001 (EP) .............................. 01203719

(51) Int. Cl.[7] .............................................. H05B 37/02
(52) U.S. Cl. .................... 315/209 SC; 315/209 CD; 315/224; 315/209 R
(58) Field of Search ................... 315/209 SC, 209 CD, 315/209 T, 209 R, 224, 244, 241 R, 291, 307, DIG. 2, DIG. 7

(56) References Cited

U.S. PATENT DOCUMENTS

| | | | | |
|---|---|---|---|---|
| 4,935,672 A | * | 6/1990 | Lammers et al. | 315/200 R |
| 4,952,845 A | * | 8/1990 | Veldman | 315/209 R |
| 5,583,399 A | * | 12/1996 | Rudolph | 315/291 |
| 5,831,396 A | | 11/1998 | Rudolph | 315/307 |
| 6,259,213 B1 | * | 7/2001 | Rudolph | 315/209 R |

FOREIGN PATENT DOCUMENTS

| | | | | |
|---|---|---|---|---|
| EP | 0294878 | | 12/1988 | ........... H05B/41/29 |
| EP | 0 648 068 A1 | * | 12/1995 | ........... H05B/41/29 |

* cited by examiner

*Primary Examiner*—Tuyet T. Vo

(57) ABSTRACT

A self-oscillating bridge circuit comprises a start circuit for rendering one of the switches conductive for the first time at the start of operation. The start circuit is configured in such a way that it does not influence the switching of the bridge switches during stationary operation.

5 Claims, 1 Drawing Sheet

CIRCUIT ARRANGEMENT INCLUDING DC-AC CONVERTER HAVING A DEPENDABLE START CIRCUIT

BACKGROUND OF THE INVENTION

The invention relates to a circuit arrangement for operating a load comprising a DC-AC-converter equipped with a first input terminal and a second input terminal for connection to the poles of a supply voltage source, a first series arrangement comprising a first switching element and a second switching element and coupled between the input terminals, a second series arrangement comprising a first capacitive element and a second capacitive element and shunting the first series arrangement, a load circuit connecting a first terminal between the first and second switching element and a second terminal between the first capacitive element and the second capacitive element and comprising connection terminals for connection to the load, control means for rendering the first and second switching element alternately conducting and non-conducting, coupled between the load circuit and control electrodes of the first and the second switching element, a start circuit comprising a third series arrangement comprising a third capacitive element and a breakdown element and coupled between the control electrode and one of the main electrodes of the first switching element, a fourth series arrangement comprising two impedances coupled to a third terminal between the third capacitive element and the breakdown element.

Such a circuit arrangement is known from EP 0 294 878 A1. In the known circuit arrangement the impedances comprised in the fourth series arrangement are ohmic resistors. The fourth series arrangement connects the first and the second input terminal and a terminal between the two ohmic resistors is connected to the third terminal. The load that is operated is a lamp. When the known circuit arrangement starts operating, the third capacitive element is charged by a current that flows from the first input terminal through one of the ohmic resistors, the load circuit and the second capacitive element to the second input terminal. When the voltage over the third capacitive element has reached a value that is approximately equal to the breakdown voltage of the breakdown element, the breakdown element becomes conductive and the third capacitive element is discharged through the breakdown element and the control electrode and a main electrode of the first switching element. The first switching element is thereby rendered conductive. In the known circuit arrangement the first switching element is the switching element that during operation is connected to the positive pole of the supply voltage source. This is advantageous because less components are needed in the start circuit in case this first switching element is rendered conductive first by the start circuit than are needed in case the second switching element is rendered conductive first. Thus the oscillation of the circuit arrangement is started by means of a start circuit that comprises only a limited amount of components and functions in a very dependable way. A disadvantage of the known circuit arrangement, however, is the fact that a DC voltage can be present over the third capacitive element during stationary operation. The presence of such a DC voltage can be caused by a difference between the conduction times of the first and the second switching element, more in particular when the duty cycles of the switching elements are below 40%. This difference between the conduction times is caused in turn by differences between the electrical properties of the switching elements. The DC-voltage over the third capacitive element influences the switching of the first switching element during stationary operation. More in particular there is the risk that both switching elements become conductive at the same time causing a shortcircuit of the supply voltage and the risk that the circuit will shortly stop oscillating causing instabilities.

SUMMARY OF THE INVENTION

The invention aims to provide a circuit arrangement for supplying a load comprising a relatively simple and dependable start circuit that does not disturb the functioning of the circuit arrangement during stationary operation.

A circuit arrangement as mentioned in the opening paragraph is therefor characterized in that the fourth series arrangement is coupled between the first input terminal and the third terminal and in that a fourth terminal between the two impedances is connected to the second terminal.

When a circuit arrangement according to the invention starts operating, the third capacitive element is charged by a current that flows from the first input terminal, through the fourth series arrangement, the third capacitive element, the load circuit and the second capacitive element to the second input terminal. When the voltage over the third capacitive element has reached a value that is substantially equal to the breakdown voltage of the breakdown element, the breakdown element becomes conductive and the third capacitive element is discharged through the breakdown element and the control electrode and a main electrode of the first switching element. The first switching element is thereby rendered conductive, and the circuit arrangement starts oscillating. Thus the start circuit in a circuit arrangement according to the invention starts the oscillating of the circuit arrangement in an effective way although the start circuit comprises only a relatively small amount of components. During stationary operation the switching elements are rendered conductive and non-conductive alternately. As a result a substantially square wave voltage is present at the first terminal. At the second terminal a DC-voltage is present with an amplitude that approximately equals the average value of the substantially square wave voltage present at the first terminal. The first terminal is connected to the second terminal by means of a series arrangement of the third capacitive element and one of the impedances. The average value of the voltage present over this series arrangement is equal to zero. Therefore the voltage over the third capacitive element is also substantially equal to zero. As a consequence the switching of the switching elements during stationary operation is not adversely affected by the start circuit.

Good results have been obtained with embodiments of a circuit arrangement according to the invention, wherein the two impedances comprised in the fourth series arrangement are ohmic resistors.

Good results have also been obtained for embodiments of a circuit arrangement according to the invention in which the first and second switching elements are bipolar transistors.

In many embodiments of a circuit arrangement according to the invention part of the current path of the current charging the third capacitive element can flow through components that fulfil another function during stationary operation. In these embodiments it is not necessary to equip the circuit arrangement with further components to make sure that the current path of the current charging the third capacitive element is complete. In other embodiments of a circuit arrangement according to the invention, however, the current path for charging the third capacitive element is either incomplete or has a total impedance that is very high. This problem can be overcome by shunting the second switching element by means of a third impedance, preferably comprising an ohmic resistor.

BRIEF DESCRIPTION OF THE DRAWING

An embodiment of a circuit arrangement according to the invention will be described making reference to a drawing.

In the drawing

DETAILED DESCRIPTION

Figure 1:
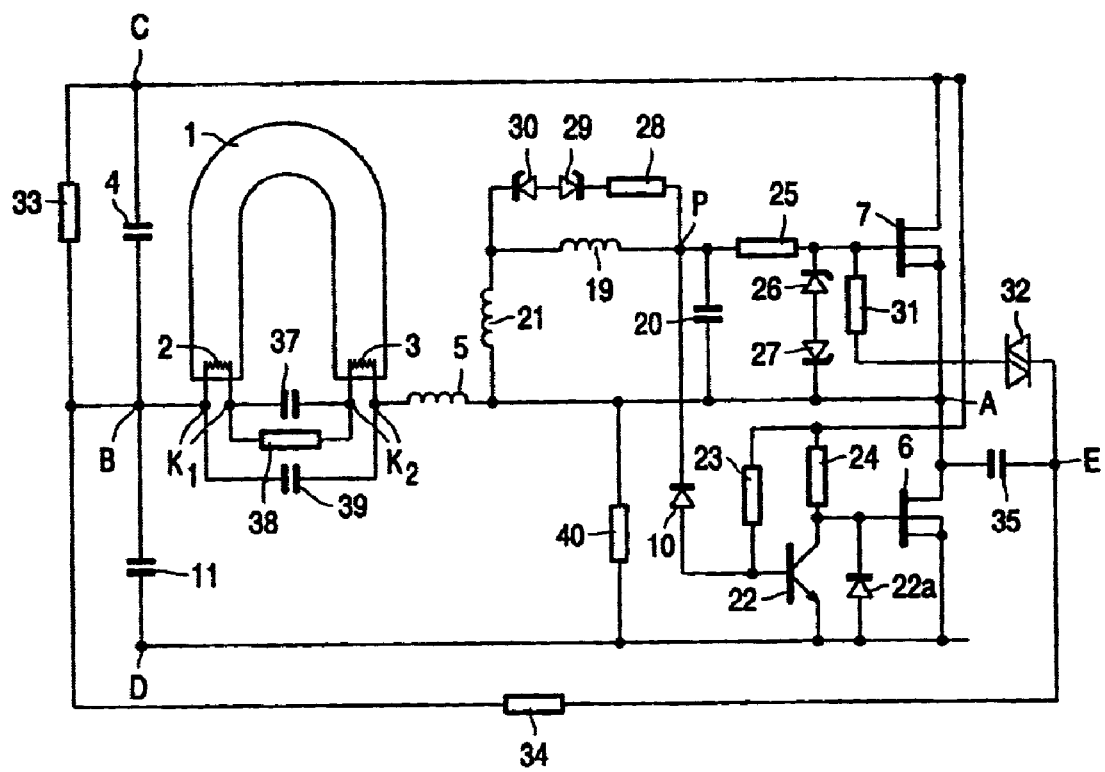
FIG. 1 is an embodiment of a circuit arrangement according to the present invention with a discharge lamp connected to it.

In FIG. 1 C and D are first and second input terminals respectively for connection to the poles of a supply voltage source. Switching element 7 forms a first switching element and switching element 6 forms a second switching element. Switching element 7 and switching element 6 together form a first series arrangement coupled between the input terminals. Capacitors 4 and 11 respectively form a first and a second capacitive element. The series arrangement of capacitors 4 and 11 forms a second series arrangement shunting the first series arrangement. A first terminal A between the switching elements is connected to a second terminal B between the first and second capacitive element by means of a series arrangement of connection terminal K1, capacitor 37, connection terminal K2 and primary winding 5. A discharge lamp 1, equipped with electrodes 2 and 3 is connected to the connection terminals K1 and K2. Capacitor 7 is shunted by ohmic resistor 38. Capacitor 39 shunts the series arrangement of electrode 2 capacitor 37 and electrode 3. Discharge lamp 1, connection terminals K1 and K2, capacitors 37 and 39, ohmic resistor 38 and primary winding 5 together form a load circuit. Switching element 6 is shunted by ohmic resistor 40. The ohmic resistor 40 forms a third impedance. 21 is a secondary winding magnetically coupled with primary winding 5. One end of secondary winding 21 is connected to the first terminal A. Secondary winding 21 is shunted by a series arrangement of inductor 19 and capacitor 20. Inductor 19 is shunted by a series arrangement of zener diodes 30 and 29 and ohmic resistor 28. Capacitor 20 is shunted by a series arrangement of ohmic resistor 25 and zener diodes 26 and 27. A common terminal of ohmic resistor 25 and zener diode 26 is connected to a control terminal of switching element 7. Input terminals C and D are connected by means of a series arrangement of ohmic resistor 24 and bipolar transistor 22. A base terminal of bipolar transistor 22 is connected to an anode of diode 10. A cathode of diode 10 is connected to a common terminal of inductor 19 and capacitor 20. Input terminal C is connected to the base terminal of bipolar transistor 22 by means of ohmic resistor 23. Bipolar transistor 22 is shunted by diode 22a. A common terminal of resistor 24 and bipolar transistor 22 is connected to a control terminal of switching element 6. The control terminal of switching element 7 is connected to the first terminal A by means of a third series arrangement of ohmic resistor 31, thyristor 32 and capacitor 35. Capacitor 35 forms a third capacitive element. A common terminal of thyristor 32 and capacitor 35 forms a third terminal E. The thyristor 32 forms a breakdown element. The third terminal E is connected to the first input terminal C by means of a fourth series arrangement of ohmic resistors 33 and 34.

Ohmic resistors 33, 34 and 31, thyristor 32 and capacitor 35 together form a start circuit. All the components that are not part of the first or second series arrangement or the start circuit together form control means for rendering the first and the second switching element alternately conducting and non-conducting.

The circuit arrangement shown in FIG. 1 operates as follows.

Immediately after the input terminals C and D have been connected to the poles of a supply voltage source, capacitor 35 is charged by means of a current that flows from first input terminal C through the series arrangement of ohmic resistors 33 and 34, capacitor 35 and resistor 40 to the second input terminal D. When capacitor 35 is charged to the breakdown voltage of thyristor 32, thyristor 32 becomes conductive. Capacitor 35 discharges by means of a current that flows from third terminal E to first terminal A through thyristor 32, ohmic resistor 31, the control electrode of switching element 7 and the main electrode of switching element 7 that is connected to the first terminal A. By means of this current switching element 7 is first rendered conductive so that the DC-AC-converter starts oscillating.

During oscillation the control means render the switching elements 7 and 6 alternately conducting and non-conducting, so that a substantially square wave shaped voltage is present at first terminal A. At second terminal B a DC voltage is present that has an amplitude that is approximately equal to the average value of the square wave shaped voltage at the first terminal A. As a consequence the average value of the voltage present over the series arrangement of resistor 34 and capacitor 35 connecting first terminal A and second terminal B is substantially zero. Therefor the voltage over capacitor 35 is also substantially zero so that the voltage over capacitor 35 does not affect the switching of switching element 7 once the circuit arrangement has started to oscillate.

The operation of the circuit arrangement, once oscillation has begun, has been described in detail in EP-0294878 and will therefore not be repeated here.

What is claimed is:

1. Circuit arrangement for operating a load comprising a DC-AC-converter equipped with
    a first input terminal and a second input terminal for connection to the poles of a supply voltage source,
    a first series arrangement comprising a first switching element and a second switching element and coupled between the input terminals,
    a second series arrangement comprising a first capacitive element and a second capacitive element and shunting the first series arrangement,
    a load circuit connecting a first terminal between the first and second switching element and a second terminal between the first capacitive element and the second capacitive element and comprising connection terminals for connection to the load,
    control means for rendering the first and second switching element alternately conducting and non-conducting, coupled between the load circuit and control electrodes of the first and the second switching element,
    a start circuit comprising
        a third series arrangement comprising a third capacitive element and a breakdown element and coupled between the control electrode and one of the main electrodes of the first switching element,
        a fourth series arrangement comprising two impedances coupled to a third terminal between the third capacitive element and the breakdown element, characterized in that the fourth series arrangement is coupled between the first input terminal and the third terminal and in that a fourth terminal between the two impedances is connected to the second terminal.

2. Circuit arrangement as claimed in claim 1, wherein the two impedances comprised in the fourth series arrangement are ohmic resistors.

3. Circuit arrangement according to claim 1, wherein the first and second switching elements are bipolar transistors.

4. Circuit arrangement according to claim 1, wherein the second switching element is shunted by a third impedance.

5. Circuit arrangement according to claim 4, wherein the third impedance comprises an ohmic resistor.

* * * * *